A. W. LIVINGSTON.
STONE SAW.
APPLICATION FILED JAN. 13, 1906. RENEWED SEPT. 10, 1908.
918,874.
Patented Apr. 20, 1909.
2 SHEETS—SHEET 1.
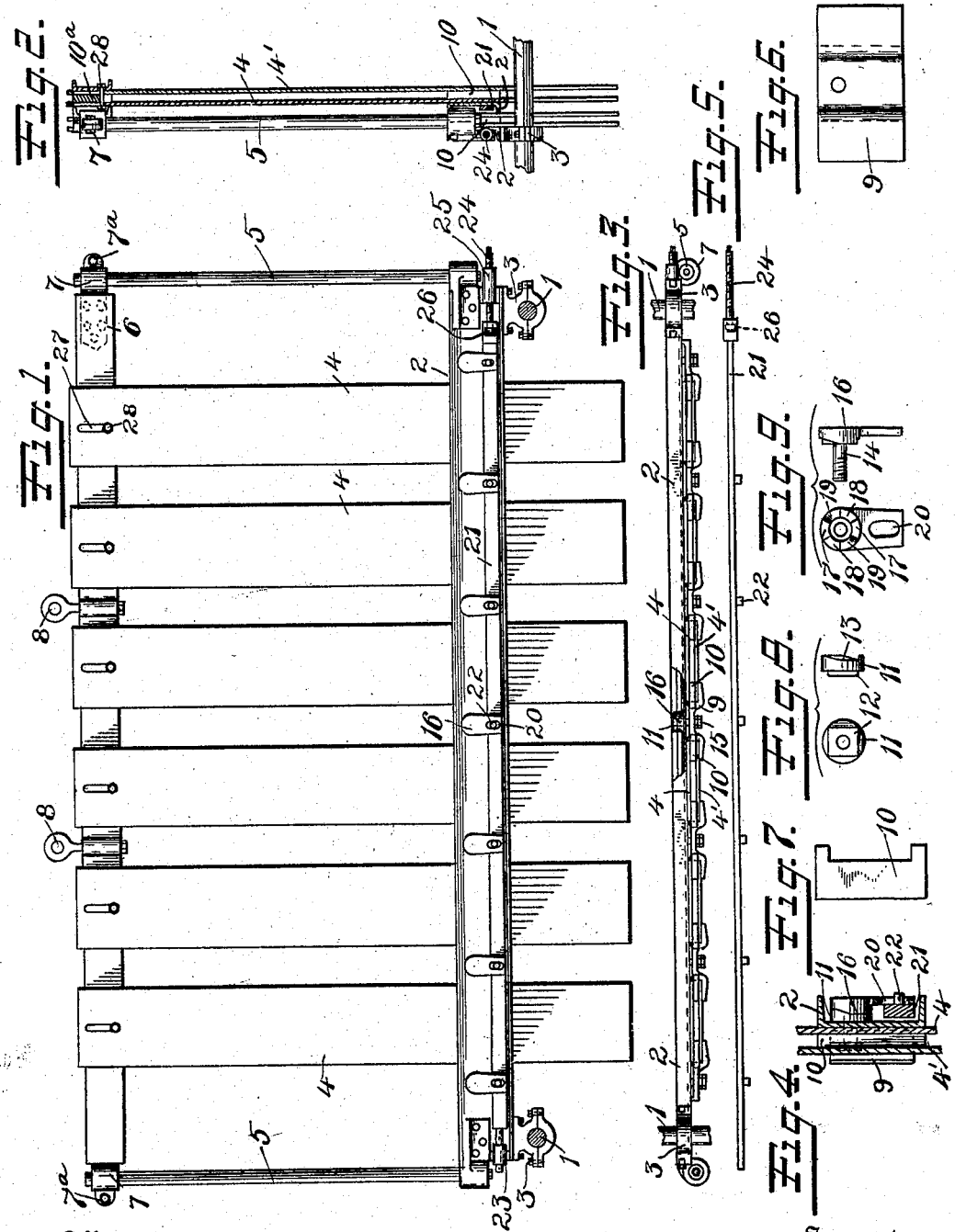

A. W. LIVINGSTON.
STONE SAW.
APPLICATION FILED JAN. 13, 1906. RENEWED SEPT. 10, 1908.
918,874.
Patented Apr. 20, 1909.
2 SHEETS—SHEET 2.
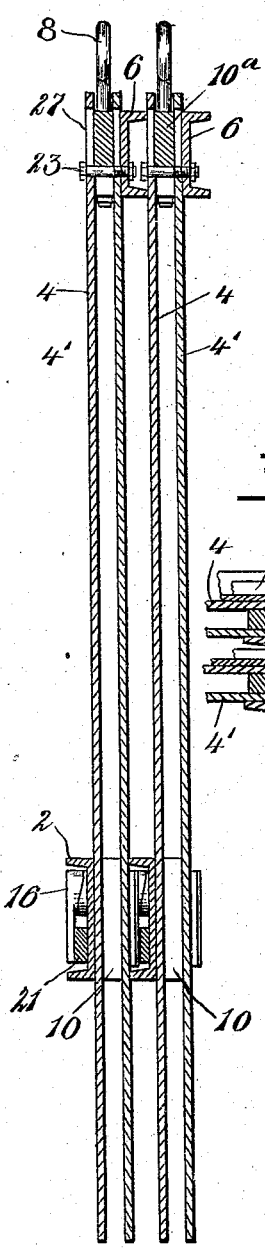
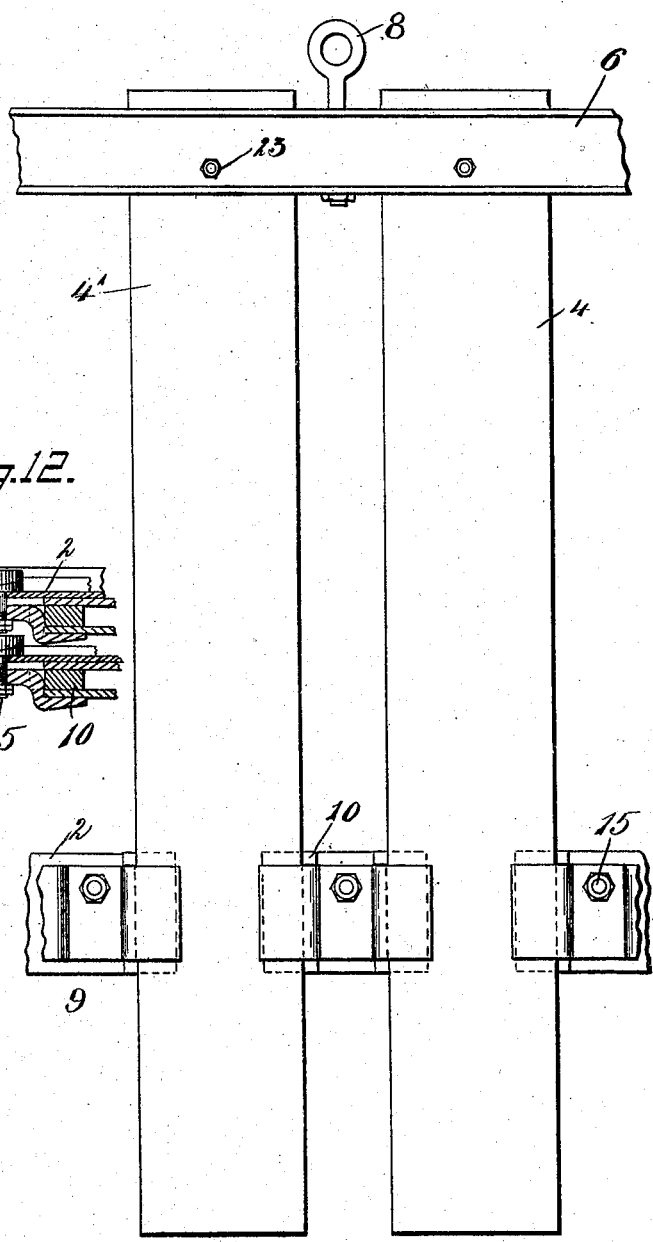

UNITED STATES PATENT OFFICE.

ANDREW W. LIVINGSTON, OF ALAMEDA, CALIFORNIA, ASSIGNOR TO THE UNITED STATES STONE SAW COMPANY, OF TUCSON, ARIZONA TERRITORY, A CORPORATION OF ARIZONA TERRITORY.

STONE-SAW.

No. 918,874.      Specification of Letters Patent.      Patented April 20, 1909.

Application filed January 13, 1906, Serial No. 295,835. Renewed September 10, 1908. Serial No. 452,449.

*To all whom it may concern:*

Be it known that I, ANDREW W. LIVINGSTON, a citizen of the United States, residing at Alameda, Alameda county, California, have invented certain new and useful Improvements in Stone-Saws, of which the following is a full, clear, and exact description.

My invention relates to improvements in stone saws, and particularly to the frame for carrying the blades.

The object of the invention is to provide a construction in which blades of considerable length may be employed without losing the rigidity afforded by the use of short blades. Incidentally, I have provided improved means for mounting the blades and clamping them so that they may be readily adjusted either individually or in series. I have so mounted the blades that they may be employed much closer together than blades of similar character heretofore employed, with the result that it is possible with my improved saw to cut exceedingly thin slabs of stone.

The saw is of a type which employs a finely divided abrasive material such as hard steel shot for effecting the cut. The pressure of the saw-blades and beam serve to operate the abrasive material.

By my improvement the blades are always maintained in correct alinement, and may be readily adjusted vertically when desired.

Only such parts of the saw are shown as are necessary for the illustration of my invention. It will be understood, however, that the saw frame is provided with suitable supports and suitable means for reciprocating it.

The single accompanying sheet of drawings illustrates the principles of the invention.

Figure 1 is a side view of a saw-frame and blades embodying the improvements of my invention. Fig. 2 is an endwise view of the same, one pair of blades being shown partially in section with end post and brackets removed. Fig. 3 is a view looking at the underside of the lower beam with the blades in place. Fig. 4 is a cross-sectional view of the lower beam and associated parts. Fig. 5 is a view of a clamp actuating rod. Fig. 6 is a rear view of a clamp-plate. Fig. 7 is a detail of a spacing block. Fig. 8 shows two views of part of the clamping mechanism. Fig. 9 shows two views of another part of the clamping mechanism. Fig. 10 is an enlarged side view of a pair of blades, viewed from the opposite side, as shown in Fig. 1. Fig. 11 is a vertical sectional view taken through a series of blades. Fig. 12 is a horizontal sectional view of the same, looking downward. Figs. 1, 2, 3, and 5 are shown on one scale, while Figs. 4, 6, 7, 8 and 9 are shown on a larger scale.

1—1 indicate two rods which extend across the machine for supporting one or more saw-frames, according to the number of cuts that it is desired to make simultaneously. The power for reciprocating the saw-frames is applied through these rods.

2 is a beam preferably in the form of a channel which is removably supported on the rods 1—1 by means of the split yokes 3—3 secured on the under side of the beam and at the opposite ends thereof.

4—4 etc. indicate a series of independent blades preferably of hardened steel arranged in alinement but spaced apart from one another. The water and abrasive material is usually fed down to the bottom of the cut between the blades. Any number of these blades may be employed, and they may be of any size. In the form of the invention herein shown I employ two series of blades, the series 4' 4' etc. being arranged alongside the other series so that a very thin slab of stone may be cut out between them. It will be obvious, however, that for certain purposes of the invention only a single series of blades may be employed.

5—5 are posts stepped in the opposite ends of the beam 2.

6 is a beam, preferably in the form of a channel iron, which is adjustably clamped to the posts 5—5 by bolts $7^a$—$7^a$.

8—8 are eye-bolts by means of which the frame as a whole may be lifted, or by means of which the upper beam and attached parts may be lifted independently of the lower beam under certain circumstances. The saw-blades are clamped to the beams 2 and 6 as hereinafter described.

9 is a clamping plate adapted to fit between the adjacent edges of two blades of a single series. 10 is a spacing block adapted to fit between two parallel blades 4 4' of the two series. One of these spacing blocks is provided at each edge of each pair of corresponding blades, and is cut out so as to fit over the top and bottom shoulders of the clamp plates. 11 is a boss having a squared portion 12 fitting in a correspondingly shaped recess in the beam 2. Its outer face 13 has cam surfaces. 14 is a stud having one end screw-threaded for receiving the nuts 15. This stud passes through the clamp plate 9 and beam 2 and the cam boss 13. 16 is a member having cam faces corresponding to the faces 13. These faces consist of two flat raised portions 17—17, two flat lower portions 18—18, and two inclined portions 19—19 connecting the raised with the lower flat portions. 20 is a vertical slot in the member 16. 21 is a bar extending longitudinally of the beam 2 and having a projection 22 fitting in the slot 20. These clamping devices are arranged at each edge of a blade. The clamping devices between the adjacent blades serve to operate for both blades. One end of the bar 21 is guided in the boss 23. At the other end the screw-threaded member 24 is adapted to be rotated and moved longitudinally in the post 25.

26 is a headed portion on the member 24, fitting in a recess in the end of the bar 21 so that the member 24 may rotate and carry the bar 21 with it longitudinally. It will be noted, therefore, that the rotation of the member 24 is transformed into a longitudinal movement of the bar 21, a swinging movement of the member 16 and the consequent cam action which serves to draw the clamp 9 up against the back of the blades and hold them securely in position. The rotation of the member 24 in the opposite direction, of course, has the reverse effect and releases the clamp. The cam surfaces having flattened areas permit the cams to be rotated relatively to one another throughout a limited extent after they have been forced apart over a distance equal to the height of the incline. The result is that the ends 15 of the different studs 14 may be adjusted to approximately the correct position and that they will then all be clamped equally to an extent which depends solely upon the height of the inclined areas 19—19. The upper ends of the blades 4 are slotted as at 27, and the bolts 28 pass through the slots and through the beam 6. As before stated beam 6 is preferably a channel iron and faces opposite to the beam 2. The clamping members 7 are secured in the channel by brackets as shown in dotted lines in Fig. 1, and clamp the rods 5 by means of the bolts 7ª as shown. The blades are secured to the flat side of the beam 6 by the bolts 28, which pass through the blades and beam. The blades are spaced apart by a spacing block 10ª with a passage-way for the bolt 28 which also supports the spacing block. By this means any individual blade may be adjusted vertically with relation to the beam 6, limited only by relation to the length of the slot 27. When the lower ends of the blades are released from the beam 2 the upper beam 6 may be lifted up together with all the blades when desired. Similarly, the blades may all be lowered simultaneously without affecting their relative positions by simply releasing the clamping members on the lower beam. It is thus possible to obtain a rigid support for the operating ends of the blades throughout substantially their entire operation, by simply occasionally shifting the position of the blades relative to the lower beam, that portion of the blade which is in the stone being sufficiently rigid.

A series of frames may be arranged side by side as shown in Fig. 2, all supported on the rods 1—1. It will thus be seen to be possible to remove or attach one or more frames to the rods 1—1 by means of the split yokes 3—3. Any one of the sets of saw-blades may be removed without disturbing the lower beams by releasing the lower set of clamps. One entire set of blades may be lowered independently of all the other sets of blades or any one blade of any one set may be raised or lowered independently of all the other sets. Provision is thus made for all conditions which may arise either of injury to the blades or wear under normal conditions. The advantages will be apparent to those skilled in the art.

By using space blocks 10 of the proper thickness a slab of stone of any thickness may be cut. The space blocks are placed between the parallel blades of each series where they are clamped to the upper and lower beams. The thickness of the space blocks regulates the distance between the corresponding blades between which they are placed. As each blade is independently removable from the frame, any one blade or series of blades may be removed and space blocks of proper thickness substituted without altering the relations of the remaining blades to each other. It is obvious, then, that if the alternate inner and outer blades of a series of two rows be removed and the space blocks used in place of the removed outer blades be a little thinner than those used in place of the removed inner blades the blades of the two rows will overlap or be offset, giving the effect of offset teeth. The cut in the stone will thus be wider than the thickness of either blade. This leaves a clearer space for the feeding of the abrasive material. Any of the blades or teeth can of course be adjusted vertically or entirely removed or replaced independently.

What I claim is:—

1. In a stone saw a frame comprising upper and lower beams, and a series of long blades clamped at their upper ends to the upper beam, and adjacent the lower ends to the lower beam.

2. In a stone saw, supporting rods for a series of saw frames, a beam, means for removably securing said beam to said rods, a series of saw blades secured to said beam, an upper beam and means for securing said blades to said upper beam.

3. In a stone saw, a frame comprising upper and lower beams, a blade, means extending therethrough for clamping the upper end of the blade to the upper beam, and means adjacent the edge of the blade for clamping the lower portion of the blade to the lower beam.

4. In a stone saw an upper beam, a series of blades carried thereby and a lower beam with means for clamping the lower portion of the blades.

5. In a stone saw a series of blades, a beam, means for clamping each blade independently to said beam, a lower beam and means for connecting all of said blades to said lower beam.

6. In a stone saw, a beam, means for supporting said beam, a series of blades, a series of separate clamps for said blades and means for operating said clamps.

7. In a stone saw, a beam, means for supporting said beam, a series of blades, a series of separate clamps for said blades and means for operating said clamps comprising a rod movable longitudinally of said beam.

8. In a stone saw, a beam, a series of blades, clamping means between the blades, cams for operating said clamping means adjustable simultaneously, each cam having a flattened surface and means for operating said cams.

9. In a stone saw, a beam, means for support, two blades placed side by side and cam means for simultaneously clamping both blades to the beam.

10. In a stone saw, a beam, two series of parallel blades, and means for simultaneously clamping all of said blades to said beam.

11. In a stone saw, a beam, two series of parallel blades, and a series of cam means for clamping all of said blades to said beam.

12. In a stone saw, a beam, two blades side by side, a clamp plate on one side of the beam only overlapping the adjusted edges thereof, and means for clamping said blades between said beam and plate.

13. In a stone saw, upper and lower reciprocable beams, and two blades clamped side by side to said beams at the top and lower portions of each blade.

14. In a stone saw, a lower beam, a series of blades carried thereby, an upper beam adjustable relatively to the lower beam and means for clamping said blades to said upper beam.

15. In a stone saw, two beams, a series of blades, means for clamping said blades individually to one beam, and means for simultaneously clamping all of said blades to the other beam.

16. In a stone saw, two beams, two series of blades, means for clamping said blades in pairs to one beam, and means for simultaneously clamping all of said blades to the other beam.

17. In a stone saw, a beam, a series of independent blades carried thereby, means for releasing said blades and means for holding said blades in position when released from said beam.

18. In a stone saw, a saw-frame, and a plurality of suitably spaced saws carried by said saw-frame, said saws each comprising a series of individual saw-blades arranged in the same plane, and means for simultaneously clamping in position all the blades of all the saws.

19. In a stone saw, a multiple-saw comprising a plurality of series of saw-blades, means for individually adjusting each blade of each series, spacing members arranged between the blades of adjacent series, clamps arranged between the blades of the several series, and means for simultaneously drawing up the clamps to lock all the blades in all the series.

20. In a stone saw, a multiple-saw comprising a plurality of series of saw-blades, the blades in each series arranged in the same plane, and the corresponding blades in the several series arranged abreast of each other, and a single set of clamps with means for simultaneously operating them to lock all the blades in all the series.

ANDREW W. LIVINGSTON.

Witnesses:
   E. H. MORGAN,
   J. A. SCHUPP.